United States Patent
Kim et al.

(10) Patent No.: US 10,356,760 B2
(45) Date of Patent: Jul. 16, 2019

(54) METHOD AND APPARATUS FOR PERFORMING ACTIVE SCANNING

(71) Applicant: LG ELECTRONICS INC., Seoul (KR)

(72) Inventors: Suhwook Kim, Seoul (KR); Kiseon Ryu, Seoul (KR); Jinyoung Chun, Seoul (KR); Wookbong Lee, Seoul (KR); Jeongki Kim, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 15/503,687

(22) PCT Filed: Dec. 12, 2014

(86) PCT No.: PCT/KR2014/012242
§ 371 (c)(1),
(2) Date: Feb. 13, 2017

(87) PCT Pub. No.: WO2016/027937
PCT Pub. Date: Feb. 25, 2016

(65) Prior Publication Data
US 2018/0213516 A1    Jul. 26, 2018

Related U.S. Application Data

(60) Provisional application No. 62/040,405, filed on Aug. 21, 2014.

(51) Int. Cl.
*H04W 84/12* (2009.01)
*H04W 72/04* (2009.01)
(Continued)

(52) U.S. Cl.
CPC ....... *H04W 72/0406* (2013.01); *H04W 48/16* (2013.01); *H04W 88/08* (2013.01);
(Continued)

(58) Field of Classification Search
CPC combination set(s) only.
See application file for complete search history.

(56) References Cited

U.S. PATENT DOCUMENTS

2013/0294394 A1* 11/2013 Kneckt ............. H04W 74/0816
                                                          370/329
2015/0085775 A1*  3/2015 Choi ................ H04W 74/0808
                                                          370/329
2015/0334751 A1* 11/2015 Alanen ................ H04W 48/16
                                                          370/329

FOREIGN PATENT DOCUMENTS

KR    10-2013-0079209    7/2013
WO       2013169072     11/2013
WO       2014010957      1/2014

OTHER PUBLICATIONS

PCT International Application No. PCT/KR2014/012242, Written Opinion of the International Searching Authority dated May 18, 2015, 4 pages.

* cited by examiner

*Primary Examiner* — Angel T Brockman
(74) *Attorney, Agent, or Firm* — Lee Hong Degerman Kang Waimey

(57) ABSTRACT

Provided is a method and apparatus for performing active scanning in a wireless communication system. The method for performing active scanning in a wireless communication system may comprise the steps of: receiving, from an access point (AP) by a station (STA), a trigger frame including information on a probing duration which allows transmis-
(Continued)

sion of a probe request; and transmitting a probe request frame to the AP during the probing duration by the STA.

8 Claims, 23 Drawing Sheets

(51) Int. Cl.
*H04W 88/08* (2009.01)
*H04W 48/16* (2009.01)
*H04L 5/00* (2006.01)
*H04W 74/08* (2009.01)
*H04L 27/26* (2006.01)

(52) U.S. Cl.
CPC ........ *H04L 5/0007* (2013.01); *H04L 27/2602* (2013.01); *H04W 74/0833* (2013.01); *H04W 84/12* (2013.01)

FIG. 1
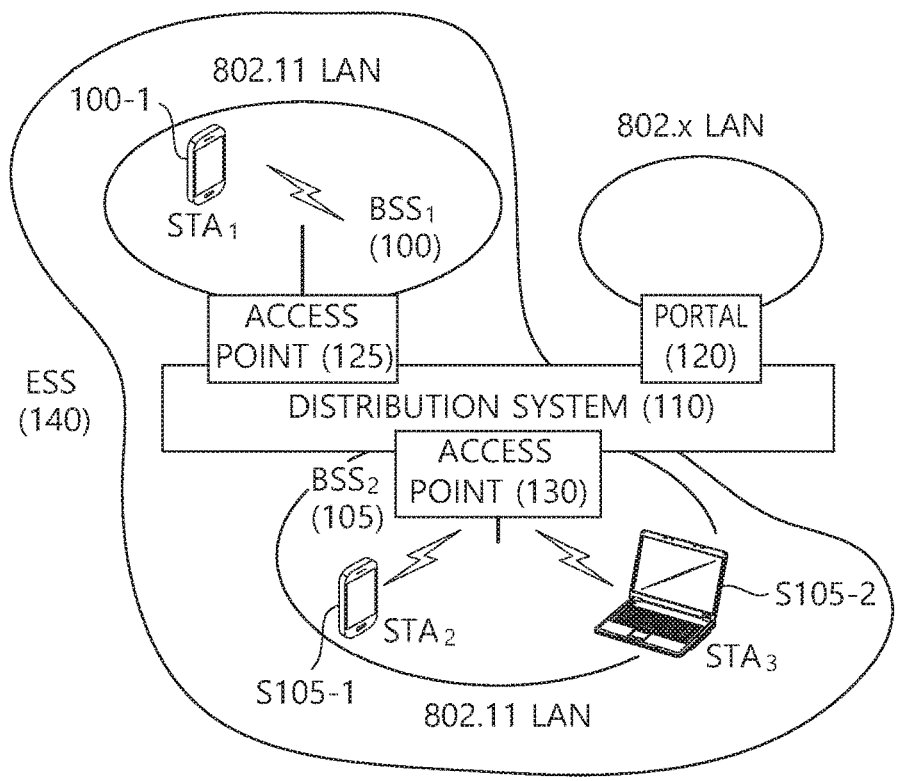
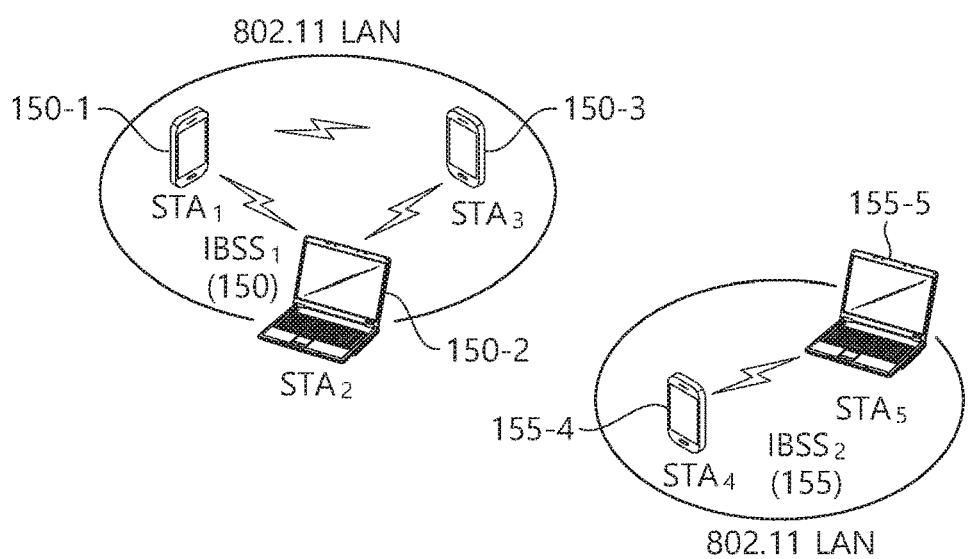

METHOD AND APPARATUS FOR PERFORMING ACTIVE SCANNING

CROSS-REFERENCE TO RELATED APPLICATIONS

This application is the National Stage filing under 35 U.S.C. 371 of International Application No. PCT/KR2014/012242, filed on Dec. 12, 2014, which claims the benefit of U.S. Provisional Application No. 62/040,405, filed on Aug. 21, 2014, the contents of which are hereby incorporated by reference herein in their entirety.

BACKGROUND OF THE INVENTION

Field of the Invention

The present invention relates to wireless communication, and more particularly, to a method and an apparatus for performing active scanning in a wireless communication system.

Related Art

Wi-Fi is a wireless local area network (WLAN) technology that allows a wireless apparatus to access the Internet in a frequency band of 2.4 GHz, 5 GHz, or 60 GHz. The WLAN is based on an Institute of Electrical and Electronics Engineers (IEEE) 802.11 standard.

An IEEE 802.11n standard supports multiple antennas and provides maximum 600 Mbit/s data rate. A system that supports IEEE 802.11n is referred to as a high throughput (HT) system.

An IEEE 802.11ac standard operates primarily in the 5 GHz band and provides data rate of 1 Gbit/s or more. The IEEE 802.11ac supports downlink multi-user multiple input multiple output (DL MU-MIMO). A system that supports IEEE 802.11ac is referred to as a very high throughput (VHT) system.

IEEE 802.11ax is developed as next-generation WLAN for coping with higher data rate and a higher user load. A scope of the IEEE 802.11ax may include 1) enhancement of an 802.11 physical (PHY) layer and a medium access control (MAC) layer, 2) enhancement of spectrum efficiency and area throughput, 3) performance enhancement in an environment in which an interference source exists, a dense heterogeneous network environment, and an environment in which the high user load exists, and the like.

The existing IEEE 802.11 standard just supports only orthogonal frequency division multiplexing (OFDM). However, it is considered that a next-generation WLAN supports orthogonal frequency division multiple access (OFDMA) in which a multiple-user access is available.

A method for forming active scanning and association is required in an OFDMA environment.

SUMMARY OF THE INVENTION

The present invention provides a method and an apparatus for performing active scanning, which perform active scanning.

In an aspect, a method for performing active scanning in a wireless communication system is provided. The method includes: receiving, from an access point (AP) by a station (STA), a trigger frame including information on a probing duration which allows transmission of a probe request; and transmitting a probe request frame to the AP during the probing duration by the STA.

According to an aspect of the present invention, provided is a method for forming active scanning and association when a transmission distance increases depending on a bandwidth in a wireless LAN.

According to another aspect of the present invention, a signal field is provided, which is transmitted/received when active scanning and association are formed in a wireless LAN.

BRIEF DESCRIPTION OF THE DRAWINGS

FIG. 1 is a concept view illustrating the structure of a wireless local area network (WLAN).

DESCRIPTION OF EXEMPLARY EMBODIMENTS

Figure 2:
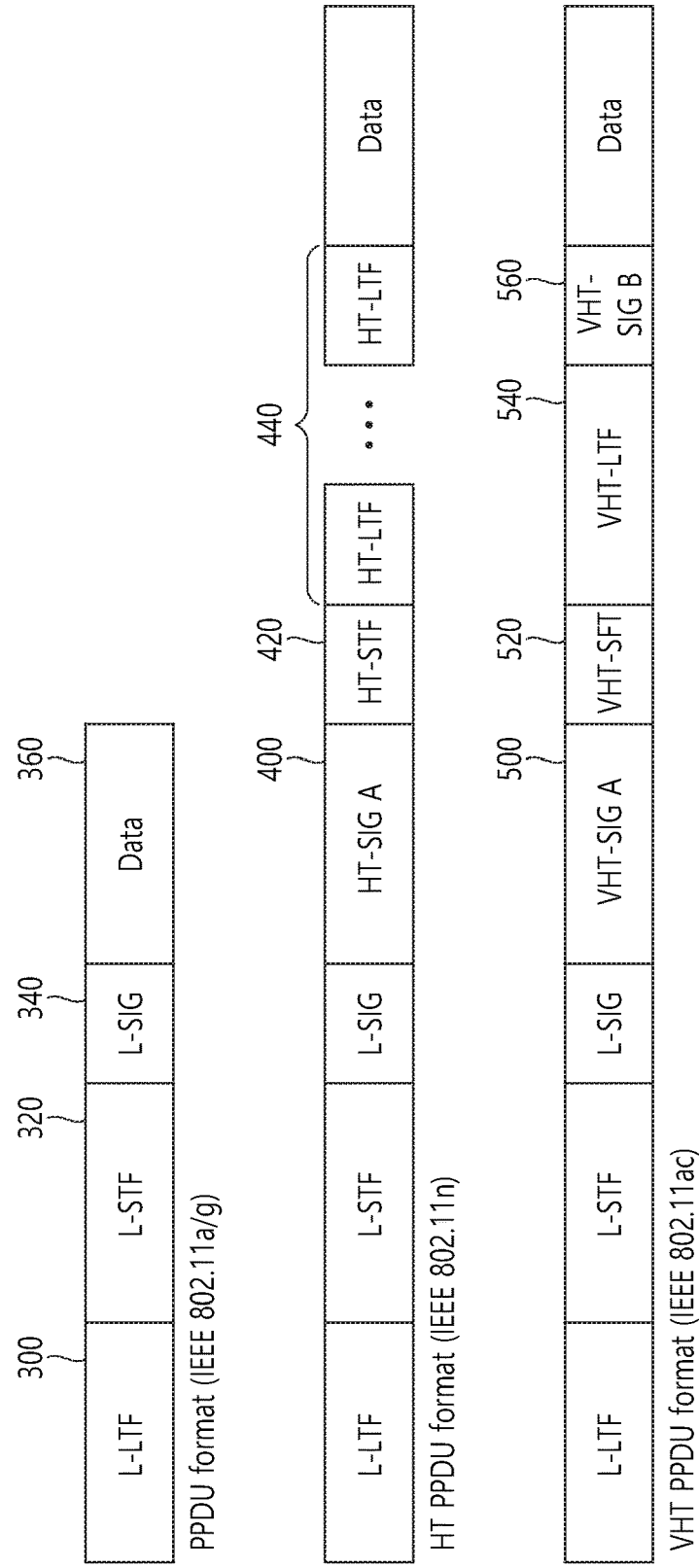
FIG. 2 is a conceptual view illustrating a PPDU format in the related art.

A wireless local area network (WLAN) system which follows Institute of Electrical and Electronics Engineers (IEEE) 802.11n standards is referred to as a high throughput (HT) system and a system which follows IEEE 802.11ac standards is referred to as very high throughput (VHT) system. Compared therewith, a WLAN system which supports orthogonal frequency division multiple access (OFDMA) is referred to as a high efficiency WLAN (HEW) system or a high efficiency (HE) system. A name called HEW or HE is just used for distinguishment from a conventional WLAN and has no any limit.

The proposed WLAN system may operate in a band of 6 GHz or less or a 60 GHz band. The band of 6 GHz or less may include at least one of a 2.4 GHz band and a 5 GHz band.

A station (STA) may be called various names including a wireless apparatus, a mobile station (MS), a network interface device, a wireless interface device, and the like. If the STA is not separately distinguished from an access point (AP) in terms of a function, the STA may include a non-AP STA or AP. When the STA is described based on communication of the STA and the AP, the STA may be interpreted as the non-AP STA. When the STA is described based on communication of the STA and the STA, the STA may be the non-AP STA or the AP.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

Hereinafter, in an embodiment of the present invention, data (alternatively, or a frame) which an AP transmits to an STA may be expressed as downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

FIG. 2 is a conceptual view illustrating a PPDU format in the related art. A Physical layer Protocol Data Unit (PPDU) is a data block generated in a physical (PHY) layer in an IEEE 802.11 standard.

As a PPDU format in an uppermost part of FIG. 2, a non-high throughput (HT) physical layer convergence procedure (PLCP) protocol data unit (PPDU) format supporting IEEE 802.11a/g is disclosed. The non-HT PPDU format may be expressed even as a term called a legacy PPDU format.

The non-HT PPDU format may include a legacy-short training field (L-STF) 300, a legacy-long training field (L-LTF) 320, a legacy SIGNAL field (L-SIG) 340, and data 350.

The L-STF 300 may include a short training orthogonal frequency division multiplexing (OFDM) symbol. The L-STF 300 may be used for frame detection, automatic gain control (AGC), diversity detection, and coarse frequency/time synchronization.

An L-LTF 320 may include a long training orthogonal frequency division multiplexing (OFDM) symbol. The L-LTF 320 may be used for fine frequency/time synchronization and channel prediction.

An L-SIG 340 may be used for transmitting control information. The L-SIG 340 may include information regarding a data rate and a data length.

The data 360 as a payload may include a Service field, a scrambled PLCP service data unit (PSDU), tail bits, and padding bits.

A middle part of FIG. 2 is a conceptual view illustrating a high throughput (HT) PPDU format.

The HT PPDU format of FIG. 2 represents an HT-mixed format PPDU for supporting IEEE 802.11n and IEEE 802.11a/g.

The HT-mixed format PPDU may further include an HT-SIG 400, an HT-STF 420, and an HT-LTF 440 in addition to the non-HT PPDU format.

The HT-SIG 400 may include information for interpreting the HT-mixed format PPDU. For example, the HT-SIG 400 may include a modulation and coding scheme (MCS), PSDU length information, space time block coding (STBC) information, and the like.

The HT-STF 420 may be used for enhancement of AGC performance, timing synchronization, and frequency synchronization. A whole length of the HT-STF 420 as 4 us may be the same as that of the L-STF, but a cyclic delay value of the HT-STF 420 may be different from that of the L-STF.

The HT-LTF 440 may be used for estimating a multiple input multiple output (MIMO) channel and estimating carrier frequency offset (CFO). Since the STA that supports the IEEE 802.11n needs to estimate channels as many as space time streams (alternatively, spatial streams), the number of HT-LTFs 440 may increase according to the number of space time streams.

A lower part of FIG. 2 is a conceptual view illustrating a very high throughput (VHT) PPDU format.

The VHT PPDU format may include an L-STF, an L-LTF, an L-SIG, a VHT-SIG-A, a VHT-STF, a VHT-LTFs, a VHT-SIG-B, and data.

The L-STF field, the L-LTF field, and the L-SIG field are fields included in the non-HT PPDU format as described above. Residual VHT-SIG-A 500, VHT-STF 520, VHT-LTF 540, and VHT-SIG-B 560 may be included only in the VHT PPDU format.

The VHT-SIG-A 500 may include information for interpreting the VHT PPDU format. The VHT-SIG-A 500 may include a VHT-SIG-A1 and a VHT-SIG-A2. The VHT-SIG-A1 may include information on a bandwidth of a used channel, whether space time block coding is applied, a group identifier (identifier) indicating a group used for transmission by grouped STAs in multi-user (MU)-MIMO, and information on the number of used streams.

The VHT-SIG-A2 may include information on whether a short guard interval (GI) is used, forward error correction (FEC) information, information on a modulation and coding scheme (MCS) for a single user, information on the type of channel coding for a plurality of users, beamforming related information, redundancy bits for cyclic redundancy checking (CRC), and tail bits of a convolutional decoder.

The VHT-STF 520 may be used for enhancing automatic gain control estimation in an MIMO environment.

The VHT-LTF 540 is used for estimating the channel in the MIMO environment.

The VHT-SIG-B 560 may include information on each STA, that is, information on the length of the PSDU and the MCS, the tail bits, and the like.

Figure 3:
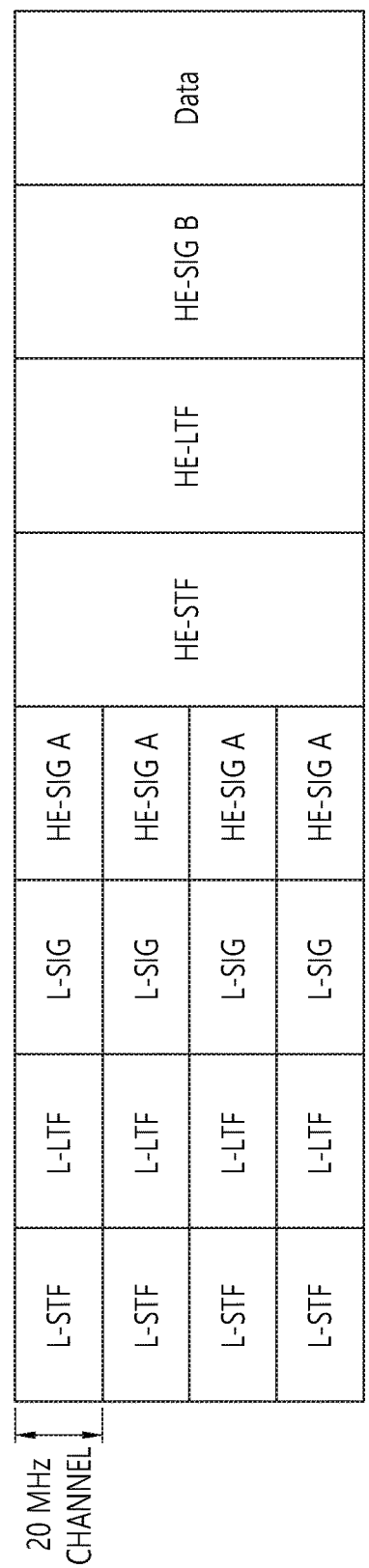
FIG. 3 is a conceptual view illustrating one example of an HE PPDU format.

FIG. 3 is a diagram illustrating one example of a high efficiency (HE) PPDU format.

FIG. 3 illustrates a PPDU transmitted in a total 80 MHz bandwidth through four 20 MHz channels. The PPDU may be transmitted through at least one 20 MHz channel. Herein, illustrated is an example in which the 80 MHz band is allocated to one reception STA. The respective 20 MHz channels may be allocated to different reception STAs.

The L-STF, the L-LTF, and the L-SIG may be the same as the L-STF, the L-LTF, and the L-SIG of the VHT PPDU. The L-STF, the L-LTF, and the L-SIG may be transmitted in an orthogonal frequency division multiplexing (OFDM) symbol generated based on 64 fast Fourier transform (FFT) points (alternatively, 64 subcarriers) in each 20 MHz channel The HE-SIG A may include common control information commonly received by the STA that receives the PPDU. The HE-SIG A may be transmitted in 2 or 3 OFDM symbols.

A table given below exemplifies information included in the HE-SIG A. A field name or a bit count is just an example and all fields are not required.

TABLE 1

| Field | Bit | Description |
|---|---|---|
| Bandwidth | 2 | Indicates the bandwidth in which the PDDU is transmitted. e.g., 20 MHz, 40 MHz, 80 MHz, or 160 MHz |
| Group ID | 6 | Indicates the STA or the STA group which will receive the PPDU |
| Stream information | 12 | Represents the number of or positions of spatial streams which will be received by the STA. |

TABLE 1-continued

| Field | Bit | Description |
|---|---|---|
| | | Alternatively, the spatial stream which will be received by each STA in the STA group |
| UL(uplink) indication | 1 | Represents whether the PPDU is used for the AP (uplink) or the STA (downlink). |
| MU indication | 1 | Represents the SU-MIMO PPDU or the MU-MIMO PPDU. |
| GI(Guard interval) indication | 1 | Represents whether a short GI or a long GI is used. |
| Allocation information | 12 | Indicates a band or channel (subchannel index or subband index) allocated to each STA in the bandwidth in which the PPDU is transmitted |
| Transmission power | 12 | Indicates transmission power for each allocated channel |

The HE-STF may be used for enhancing the AGC estimation in the MIMO transmission. The HE-LTF may be used for estimating the MIMO channel The HE-SIG B may include user specific information required for each STA to receive data (that is, physical layer service data unit (PSDU)) thereof. The HE-SIG B may be transmitted in 1 or 2 OFDM symbols. For example, the HE-SIG B may include information on the length of the corresponding PSDU and the modulation and coding scheme (MCS) of the corresponding PSDU.

The L-STF, L-LTF, L-SIG, and HE-SIG A may be repeatedly transmitted by the unit of the 20-MHz channel. That is, when the PPDU is transmitted to four 20 MHz channels, the L-STF, L-LTF, L-SIG, and HE-SIG A may be duplicatively transmitted for each 20 MHz channel.

From the HE-STF (alternatively, after the HE-SIG A), the FFT size per frequency may further increase. For example, 256 FFT may be used in the 20-MHz channel, 512 FFT may be used in the 40-MHz channel, and 1024 FFT may be used in the 80-MHz channel. When the FFT size increases, an OFDM subcarrier spacing decreases, and as a result, the number of OFDM subcarriers per frequency increases, but on the contrary, an OFDM symbol time may increase. The length of the GI after the HE-STF may be set to be the same as the length of the GI of the HE-SIG A.

Figure 4:
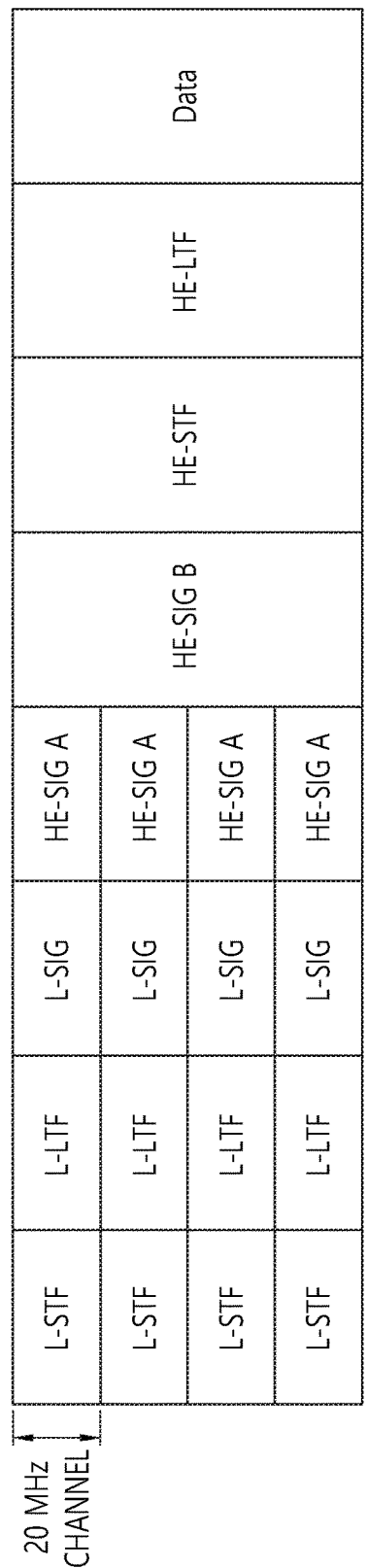
FIG. 4 is a conceptual view illustrating another example of the HE PPDU format.

FIG. 4 is a conceptual view illustrating another example of the HE PPDU format.

The PPDU format of FIG. 4 is the same as the PPDU format of FIG. 2 except the HE-SIG B is disposed next to the HE-SIG A. From the HE-STF (alternatively, after the HE-SIG B), the FFT size per frequency may further increase.

Figure 5:
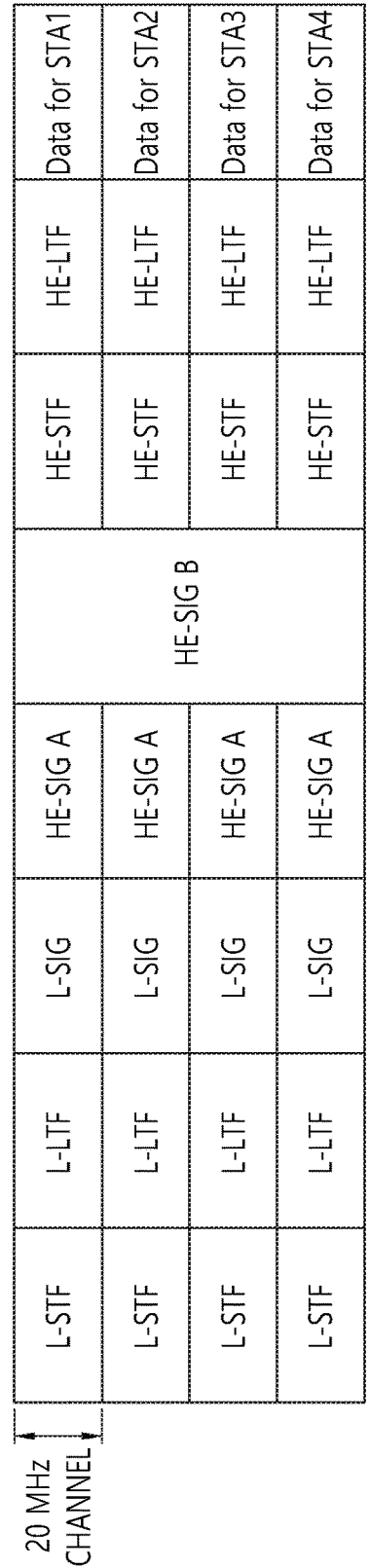
FIG. 5 is a conceptual view illustrating yet another example of the HE PPDU format.

FIG. 5 is a conceptual view illustrating yet another example of the HE PPDU format.

The HE-SIG B is disposed next to the HE-SIG A. The respective 20 MHz channels are allocated to different STAs (STA1, STA2, STA3, and STA4). The HE-SIGB includes information specific to each STA, but is encoded throughout a full band. That is, the HE-SIGB may be received by all STAs. From the HE-STF (alternatively, after the HE-SIG B), the FFT size per frequency may further increase.

When the size of the FFT increases, the legacy STA supporting the existing IEEE 802.11a/g/n/ac may not decode the corresponding PPDU. The L-STF, L-LTF, and L-SIG are transmitted through 64 FFT in the 20-MHz channel so as to be received by the legacy STA for coexistence of the legacy STA and the HE STA coexist. For example, the L-SIG occupies one OFDM symbol and one 01-DM symbol time is 4 us, and the GI is 0.8 us.

The HE-SIG A includes the information required for the HE STA to decode the HE PPDU, but may be transmitted through the 64 FFT in the 20 MHz channel so as to be received by both the legacy STA and the HE STA. This is for the HE STA to receive the existing HT/VHT PPDU in addition to the HE PPDU. In this case, the legacy STA and the HE STA need to distinguish the HE PPDU and the HT/VHT PPDU.

Figure 6:
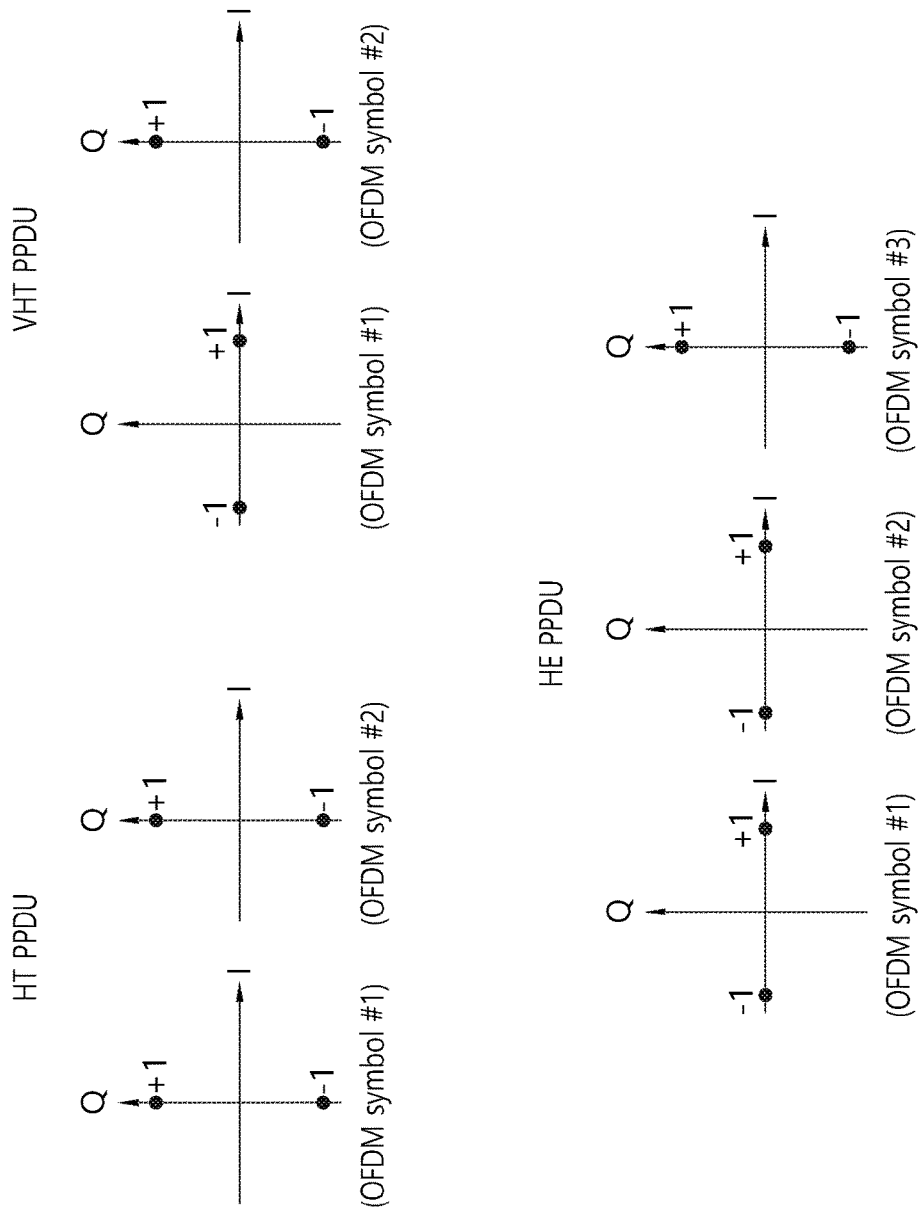
FIG. 6 illustrates one example of phase rotation for distinguishing a PPDU.

FIG. 6 illustrates one example of phase rotation for distinguishing a PPDU.

In order to distinguish vide the PPDU, phases of constellations for the OFDM symbols transmitted after the L-STF, L-LTF, and L-SIG are used.

OFDM symbol #1 represents a first OFDM symbol after the L-SIG, OFDM symbol #2 represents an OFDM symbol subsequent to after OFDM symbol #1, and OFDM symbol #3 represents an OFDM symbol subsequent to after OFDM symbol #2.

In the non-HT PPDU, the phases of the constellations used for the $1^{st}$ OFDM symbol and the $2^{nd}$ OFDM symbol are the same as each other. Binary phase shift keying (BPSK) is used in both the $1^{st}$ OFDM symbol and the $2^{nd}$ OFDM symbol.

In the HT PPDU, the phases of the constellations used for OFDM symbol #1 and 01-DM symbol #2 are the same as each other and rotate at 90° counterclockwise. A modulation scheme having the constellation which rotates at 90° is referred to as quadrature binary phase shift keying (QBPSK).

In the VHT PPDU, the phase in OFDM symbol #1 does not rotate, but the phase in OFDM symbol #2 rotates at 90° counterclockwise similarly to the HT PPDU. Since the VHT-SIG A is transmitted after the L-SIG and the VHT-SIG A is transmitted in 2 OFDM symbols, OFDM symbol #1 and OFDM symbol #2 are used for transmitting the VHT-SIG A.

In order to distinguish the HE PPDU from the HT/VHT PPDU, the phases of three 01-DM symbols transmitted after the L-SIG may be used in the HE PPDU. The phases of OFDM symbol #1 and OFDM symbol #2 do not rotate, but the phase of OFDM symbol #3 rotates at 90° counterclockwise. OFDM symbol #1 and OFDM symbol #2 use the BPSK modulation and OFDM symbol #3 uses the QBPSK modulation.

Since the VHT-SIG A is transmitted after the L-SIG and the VHT-SIG A is transmitted in 3 OFDM symbols, all of OFDM symbol #1, OFDM symbol #2, and OFDM symbol #3 may be used for transmitting the HE-SIG A.

Operating multiple channels in the existing WLAN is used for providing a larger bandwidth in one STA. In addition, whether a secondary channel is also determined according to a clear channel assessment (CCA) result of a primary channel. In this case, it is considered that the secondary channel is used in an overlapped basic service set (OBSS) environment.

Figure 7:
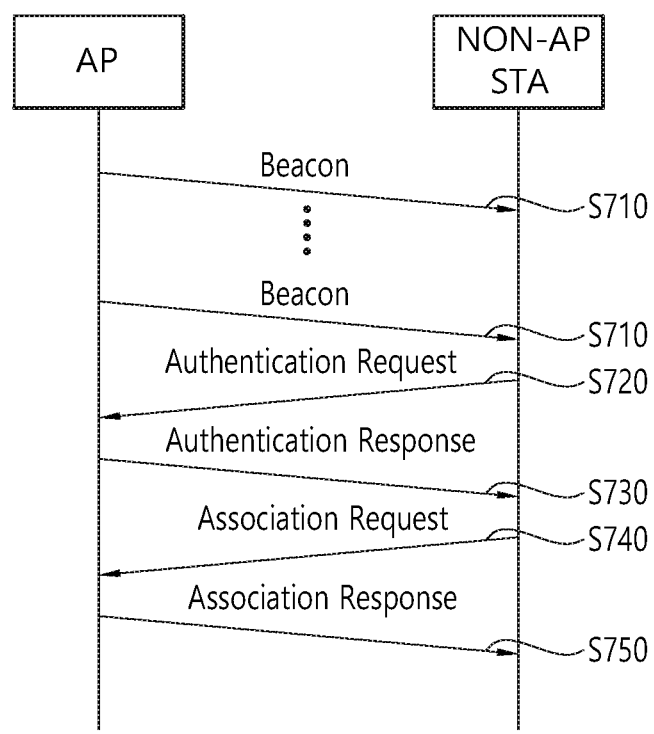
FIG. 7 is a diagram illustrating a passive scanning process in the related art.
Figure 8:
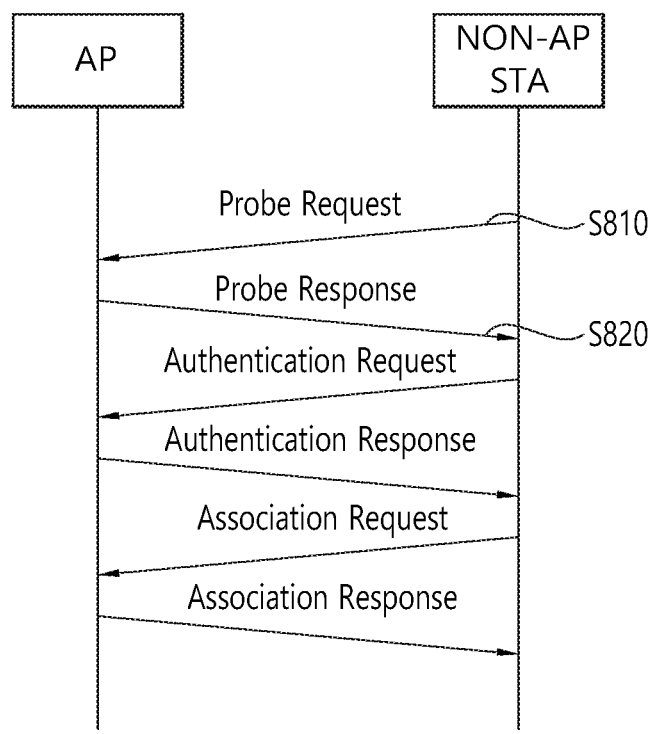
FIG. 8 is a diagram illustrating an active scanning process in the related art.

Meanwhile, in the WLAN, a scanning procedure includes passive scanning and active scanning FIGS. 7 and 8 are diagrams illustrating scanning and association forming processes in the related art.

FIG. 7 illustrates a passive scanning process and FIG. 8 illustrates an active scanning process.

The passive scanning is performed through a beacon frame which is periodically broadcasted by the AP. Generally, the AP of the WLAN broadcasts the beacon frame every 100 msec (S710), and the beacon frame includes information on the current network. That is, in order to obtain information on the network, the non-AP STA manually waits for reception of the beacon frame in the corresponding channel.

The non-AP STA which has obtained the information on the network through the beacon frame ends the scanning on the corresponding channel. It is advantageous in that the passive scanning is performed only when the non-AP STA receives the beacon frame without transmission of another frame, thereby reducing the overall overhead. However, there is a disadvantage that the scanning execution time is increased in proportion to the beacon frame period.

After the scanning process, the non-AP STA selects a network according to its own standard and then establishes authentication with the AP. The authentication process is configured by a two-way handshaking. That is, when the non-AP STA transmits an authentication request frame to the AP (S720), the AP receiving the authentication request frame transmits an authentication response frame to the non-AP STA (S730) and then the authentication process is established.

Through the authentication process, the non-AP STA and the AP authenticate each other and then form an association.

The association process is also performed by a two-way handshaking. First, the non-AP STA transmits an association request frame to the AP (S740). The transmitted association request frame includes capability Information on the performance of the non-AP STA. Based on this, the AP may determine whether or not to support the non-AP STA. The AP determines whether or not to support the non-AP STA and then transmits whether or not to accept the association request frame in the association response frame, the reason thereof, and the capability information supportable by the AP to the non-AP STA.

In the active scanning in FIG. 8, the non-AP STA actively transmits a probe request frame through the corresponding channel (S810).

The AP receiving the probe request frame waits for a random time to prevent a frame collision and then transmits a probe response frame including network information in the probe request frame to the non-AP STA (S820). The non-AP STA receiving the probe response frame obtains the network information, thereby completing the scanning process. The active scanning has an advantage of finishing scanning for a relatively rapid time. However, since an additional frame sequence is required, the overall network overhead is increased.

The authentication and association processes after scanning are the same as steps S720 to S750 in FIG. 7, and duplicated description will be omitted.

If the association is normally established, normal transmission/reception is performed, and if the association is not established, the non-AP STA may try the association process again or try an association process with another AP based on the reason.

As described above, IEEE 802.11ax currently under development is actively under discussion for an OFDMA technology. In case of applying a multi-user OFDMA (MU-OFDMA) technique in uplink (UL) transmission, the STA can transmit data at a bandwidth smaller than 20 MHz which is an existing minimum transmission bandwidth. In this case, since the transmission power of the STA is not changed, a transmission distance of the data increases. In this situation, when the data is transmitted by a single user OFDM (SU-OFDM), if the minimum UL transmission bandwidth is limited to 20 MHz in the related art, the transmission distance is reduced as compared with the case of transmitting data by the MU-OFDMA scheme.

In the structure of the current IEEE 802.11 system, the association process may be performed only by the SU-OFDM scheme. If there is no mobility of the STA, the UL transmission by the MU-OFDMA scheme is possible only after the association process by the SU-OFDM scheme. This means that although the STA performs the UL transmission in the MU-OFDMA scheme, an effect of increasing a substantial transmission distance may not be obtained.

Figure 9:
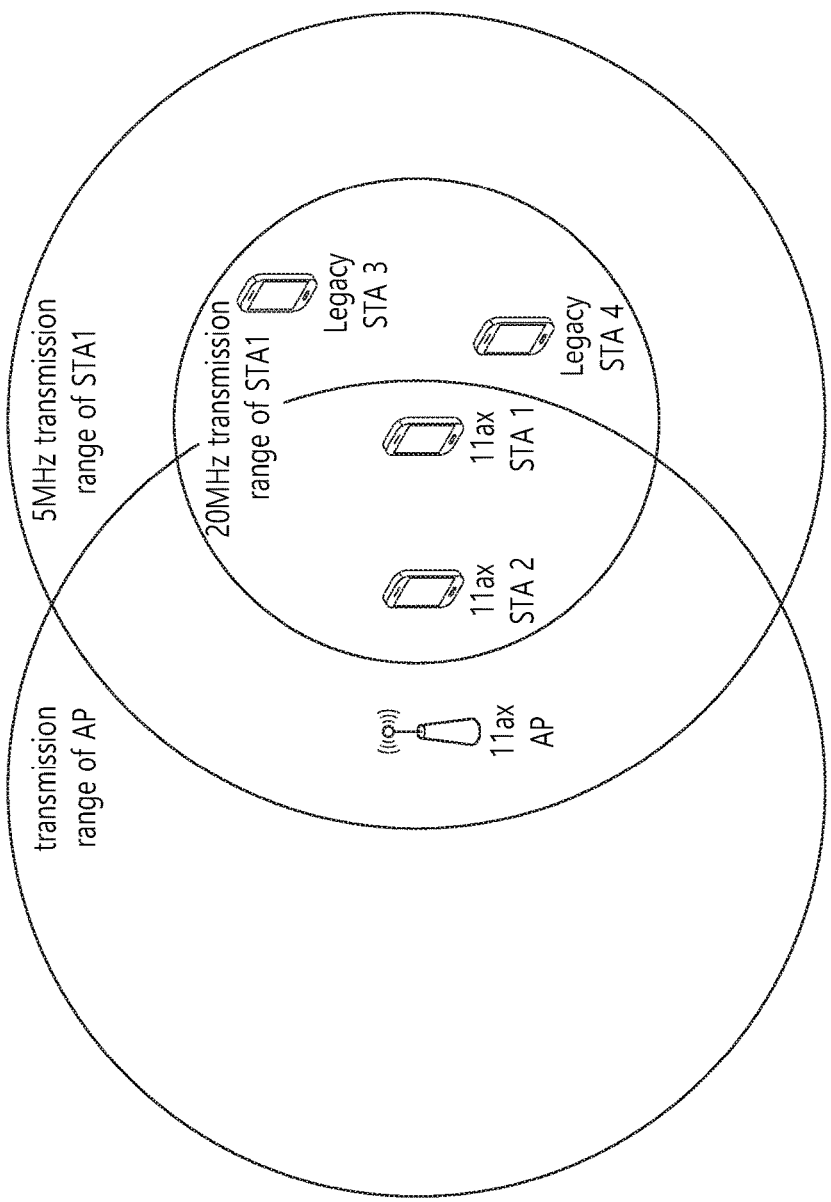
FIG. 9 is a diagram exemplarily illustrating an IEEE 802.11ax network environment considered by the present invention.

FIG. 9 is a diagram exemplarily illustrating an IEEE 802.11ax network environment considered by the present invention. The AP, STA1, and STA2 in FIG. 9 are wireless devices to which IEEE 802.11ax is applied, and STA3 and STA4 are wireless devices to which a legacy scheme is applied.

Since the AP has a larger transmission power than the STA, the AP has a longer transmission distance than the STA in the same band. It is assumed that when STA1/STA2 supports OFDMA, the STA1/STA2 uses a smaller bandwidth (e.g., a bandwidth of 5 MHz) than the bandwidth of 20 MHz. When considering the same transmission power, the STA1/STA2 may have a longer transmission distance than STA3/STA4 using the bandwidth of 20 MHz.

STA1 is positioned at a distance where the data may be received from the AP, but may not be transmitted at the bandwidth of 20 MHz. This means that STA1 may perform passive scanning, but may not find the AP through active scanning. In the existing 802.11 system, the probe request frame for active scanning supports only a minimum bandwidth of 20 MHz. However, if STA1 may transmit a probe request with a bandwidth smaller than the bandwidth of 20 MHz, the probe request may reach the AP.

The present invention proposes a method of performing scanning and association in a distance longer than the distance that the STA can transmit the probe request in the bandwidth of 20 MHz in IEEE 802.11ax. Hereinafter, 20 MHz as a first bandwidth and 5 MHz as a bandwidth smaller than the first bandwidth will be exemplified.

Figure 10:
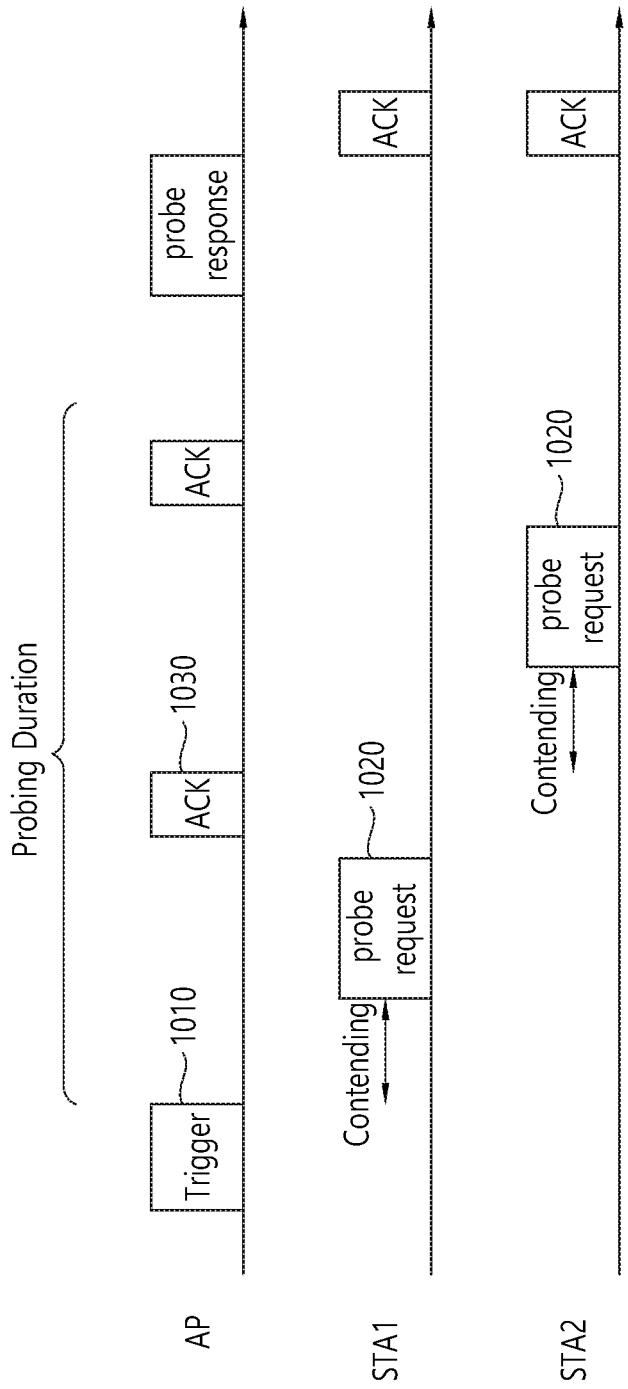
FIG. 10 is a diagram illustrating one example of an active scanning process according to one aspect of the present invention.

FIG. 10 is a diagram illustrating one example of an active scanning process according to one aspect of the present invention.

The AP may periodically transmit a trigger frame 1010 including information on probing duration to the STA. The probing period represents a time that the STA may transmit the probe request frame, starts immediately after the AP transmits the trigger frame, and is valid until the time specified in the trigger frame.

The STA that receives the trigger frame and desires to receive the network information of the corresponding AP among the STAs in which the association is not yet formed or desires to form the association may transmit a probe request frame 1020 during the probing period. As illustrated in FIG. 10, STA1 and STA2 may transmit a probe request frame to the AP through contending. In this case, STA1 and STA2 transmit the probe request frame in the bandwidth of 5 MHz to transmit the probe request frame to the AP.

The AP normally receiving the probe request frame may transmit an ACK signal 1030 to the STA transmitting the probe request frame.

After the probing period ends, the AP transmits a probe response frame 1040 including network information to the SATs that have transmitted the probe request frame during the probing period.

The AP may transmit the trigger frame or the probe response frame to the SAT using the MU-OFDMA scheme or the MU-MIMO scheme. The SAT may also transmit the probe request frame to the AP through the MU-OFDMA scheme.

Figure 11:
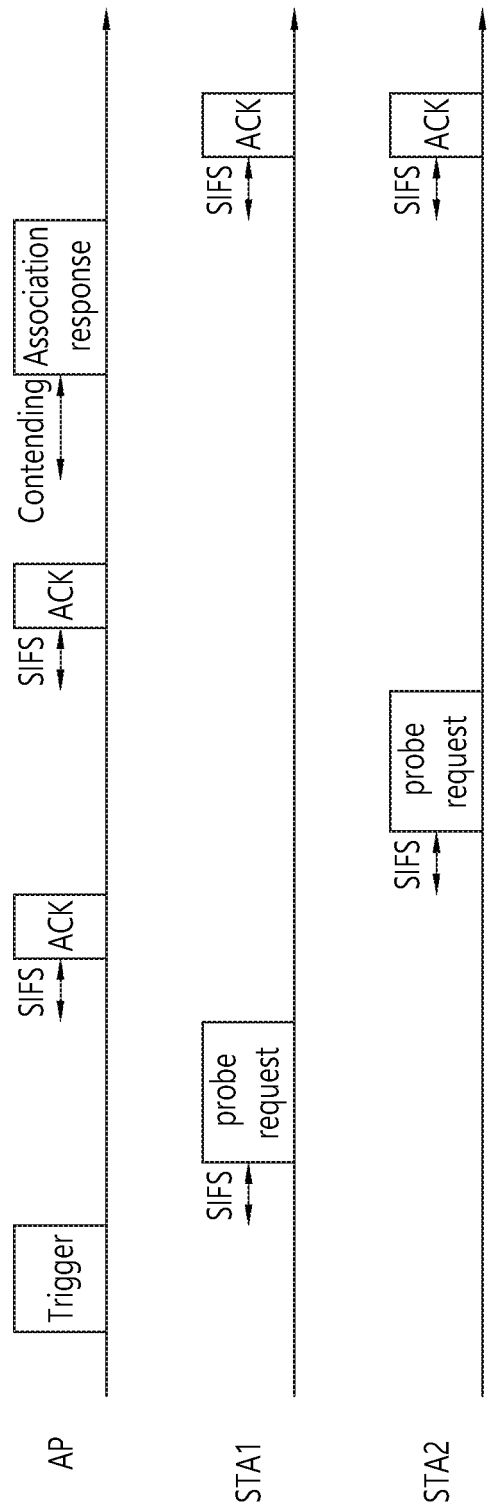
FIG. 11 is a diagram illustrating another example of the active scanning process according to one aspect of the present invention.

FIG. 11 is a diagram illustrating another example of the active scanning process according to one aspect of the present invention.

Frames may be transmitted and received at a specific interval. For example, the specific interval may include a short interframe space (SIFS). After the transmission of the trigger frame 1110 of the AP, a probe request frame 1120 by the SAT may be transmitted to the AP after an SIFS interval. The SIFS is merely an example, and the specific interval may include a point coordination function (PCF) interframe space (PIFS) or any specified interval. Specific intervals of different sizes may be used for each frame.

The STA1/STA2 arbitrarily sets the transmission order and then may transmit the corresponding probe request frame to the AP every SIFS interval according to the set transmission order. In this case, STA1 and STA2 transmit the probe request frame in the bandwidth of 5 MHz to transmit the probe request frame to the AP. If two or more STAs simultaneously transmit the probe request frame, a collision may occur. Even if the collision occurs, the AP transmits an ACK only to the received probe request frame, so that the STA1/STA2 may verify whether or not to collide the probe request.

Figure 12:
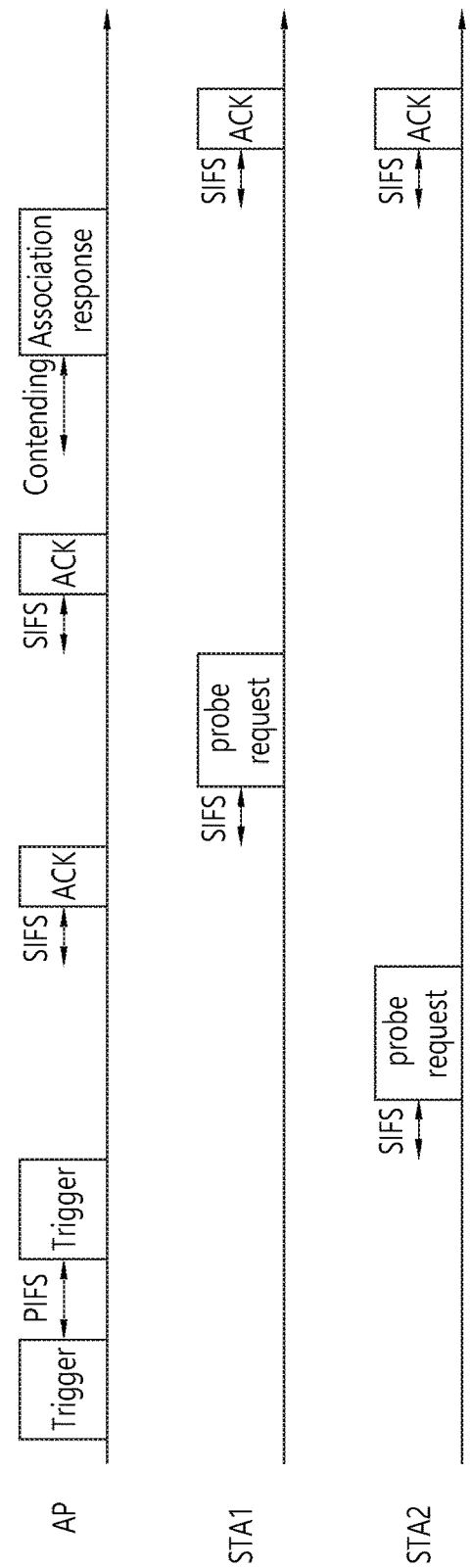
FIG. 12 is a diagram illustrating yet another example of the active scanning process according to one aspect of the present invention.

FIG. 12 is a diagram illustrating yet another example of the active scanning process according to one aspect of the present invention.

When comparing Example in FIG. 11, it is illustrated that when the probe request is not received during SIFS after the transmission of the trigger frame, the AP transmits the trigger frame again after PIFS.

Figure 13:
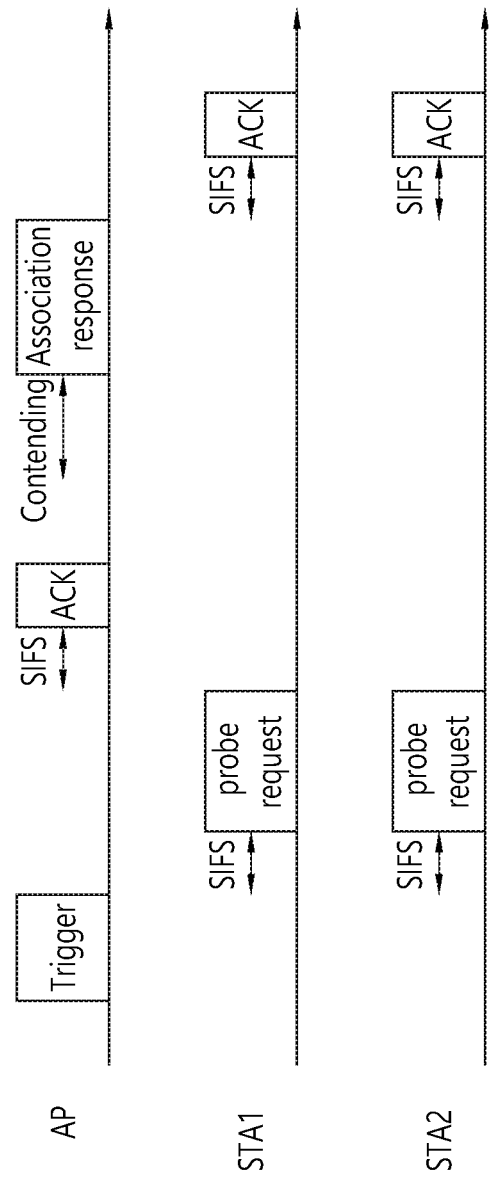
FIG. 13 is a diagram illustrating still yet another example of the active scanning process according to one aspect of the present invention.

FIG. 13 is a diagram illustrating still yet another example of the active scanning process according to one aspect of the present invention.

It is illustrated that when comparing Examples in FIGS. 11 and 12, STA1 and STA2 transmit the probe request frame to the AP through the MU-OFDMA scheme. The STA1 and STA2 may transmit a probe request frame on a subchannel (e.g., a 5 MHz channel) within a broadband channel (e.g., 20 MHz channel) on which the trigger frame is received. The subchannel may be randomly determined by the STA1 and the STA2, and the AP may also provide information for determining the subchannel to the STA1 and the STA2.

With respect to any one of the contention-based transmission of FIG. 10, the transmission order based transmission of FIG. 11 and the MU-OFDMA based transmission of FIG. 13, collision very frequently occurs when the number of STAs to transmit the probe request frame is very large, or the transmission of the probe request frame may be delayed. Accordingly, the trigger frame may include information for performing the scanning by the STA.

The following table illustrates fields included in the trigger frame. The field names are just exemplified. All of the fields are not required and any field may be omitted.

TABLE 2

| Field name | Description |
|---|---|
| Probe period | The probing period represents a time that the STA may transmit the probe request frame. When probing period information is omitted, the UE may transmit the probe request frame at any time after receiving the trigger frame. When the value of the probing period is set to a specific value (e.g., 0), the frame transmission of the STA at a long distance may be blocked |
| Trigger period | The trigger period represents a period when the trigger frame is transmitted. The STA may wait for the transmission of the next trigger frame through the trigger period. The trigger period may be smaller than a beacon interval. |
| Trigger frame type | The trigger frame type represents a type of trigger |

TABLE 2-continued

| Field name | Description |
| --- | --- |
| | frame. For example, it is possible to distinguish whether the trigger frame is a trigger frame transmitted to an unspecified terminal, a trigger frame for an association request, or a trigger frame for UL MU-MIMO or UL MU-OFDMA for a probe request. |
| Scanning permission information | Information on STAs or STA set to which the transmission of probe request frames is permitted. |
| Transmission order | Transmission order of STAs to transmit probe request frame |
| Subchannel | Information on subchannel or bandwidth to transmit probe request frame |

The scanning permission field may include scanning permission information regarding an identifier of an STA or an STA set to which transmission of the probe request frame is permitted. For example, the scanning permission field may include a period of an identifier (e.g., MAC address) of the STA. The STA may transmit a probe request frame if its identifier is one of the identifiers specified by the scanning permission field.

The scanning permission field may include information on a permission value or a permission period. For example, it is assumed that the value of the scanning permission field includes 7 and 15. The STA first selects a value between 0 and 15. When the selected value belongs between 7 to 15, the STA may transmit the probe request frame.

The trigger frame may be replaced with an existing beacon frame or included in the beacon frame. Even after scanning according to reception of the beacon frame, the UE may transmit an intention expression for an additional scanning information request or an association request to the AP. In this case, the AP may transmit an additional beacon frame to the UE according to the request of the UE, and information that may be included in the proposed trigger frame may be included in the beacon frame. The trigger frame information may not be included in all of the beacon frames, but may be included only in a beacon frame at a particular period (e.g., whenever the beacon frame is transmitted three times).

Alternatively, according to another aspect, the beacon frame may notify information on the transmission of the trigger frame. The beacon frame may provide information on the period and/or the transmission time when the trigger frame is transmitted to the STA.

Hereinafter, formats of the trigger frame, the probe request frame, and the probe response frame will be described.

Figure 14:
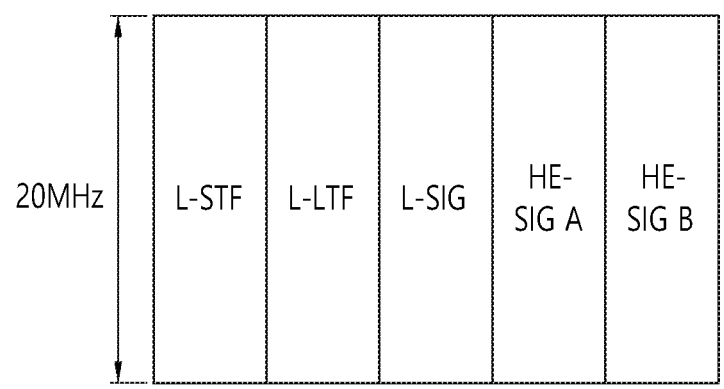
FIG. 14 is a diagram illustrating one example of a format of a trigger frame according to one aspect of the present invention.

FIG. 14 illustrates one example of a format of a trigger frame. FIG. 14 illustrates that the trigger frame is generated based on the PPDU of FIG. 5.

The L-STF, L-LTF, and L-SIG are the same as the components of the PPDU format. The HE-SIG B may include the information of the trigger frame. It is illustrated that the HE-STF and the HE-LTF are omitted, but the HE-STF and the HE-LTF may not be omitted.

Figure 15:
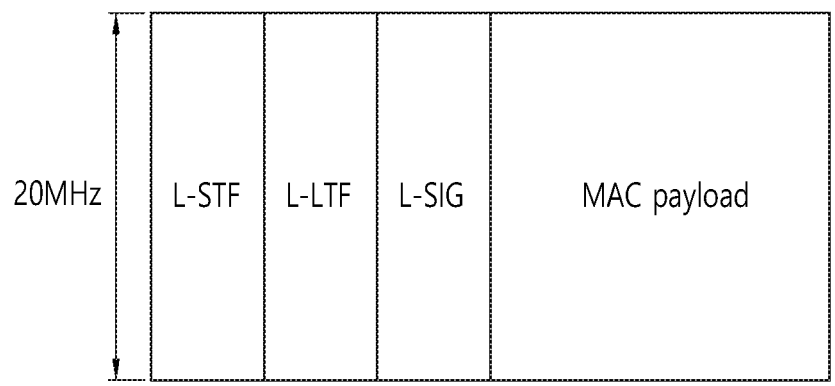
FIG. 15 is a diagram illustrating another example of the format of the trigger frame according to one aspect of the present invention.

FIG. 15 illustrates another example of the format of the trigger frame. FIG. 15 illustrates that the trigger frame is generated based on the legacy PPDU format of FIG. 3. The trigger frame is transmitted as an MAC frame. An MAC payload may include the information of the trigger frame.

Figure 16:
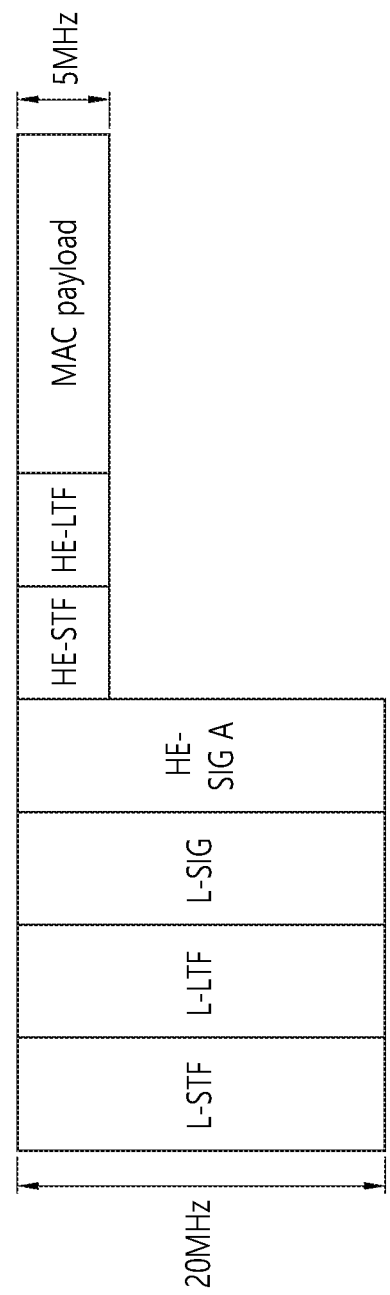
FIG. 16 is a diagram illustrating one example of a probe request frame according to one aspect of the present invention.

FIG. 16 illustrates one example of a format of a probe request frame.

The probe request frame may additionally include an association intent in addition to the existing information. The association intent may indicate that since the STA already knows information on a network by previously receiving a beacon frame, the STA requests an association to the AP. That AP that receives the association intent may transmit a trigger frame for an association request frame without transmitting a probe response to the corresponding STA.

The L-STF, L-LTF, and L-SIG are the same as the components of the PPDU format. Therefore, since both the HE STA and the legacy STA may perform decoding, a transmission opportunity (TXOP) of the probe request frame may be protected. For example, in FIG. 9, all of STA2, STA3, and STA4 near STA1 may protect the TXOPs of STA1, STA2, STA3, and STA4 until receiving an ACK by decoding the field.

The HE-SIG A may include the fields of Table 1. The MAC payload may include information on the probe request frame.

UE that receives the trigger frame may immediately transmit the association request frame instead of the probe request frame. A process therefor will be described below.

When the UE transmits the probe request frame through the MU-OFDMA scheme as illustrated in FIG. 13, the L-STF/L-LTF/L-SIG/HE-SIG A may be transmitted in the 20 MHz bandwidth and the HE-STF, HE-LTF, and MAC payload may be transmitted in the smaller bandwidth (e.g., 5 MHz bandwidth).

Figure 17:
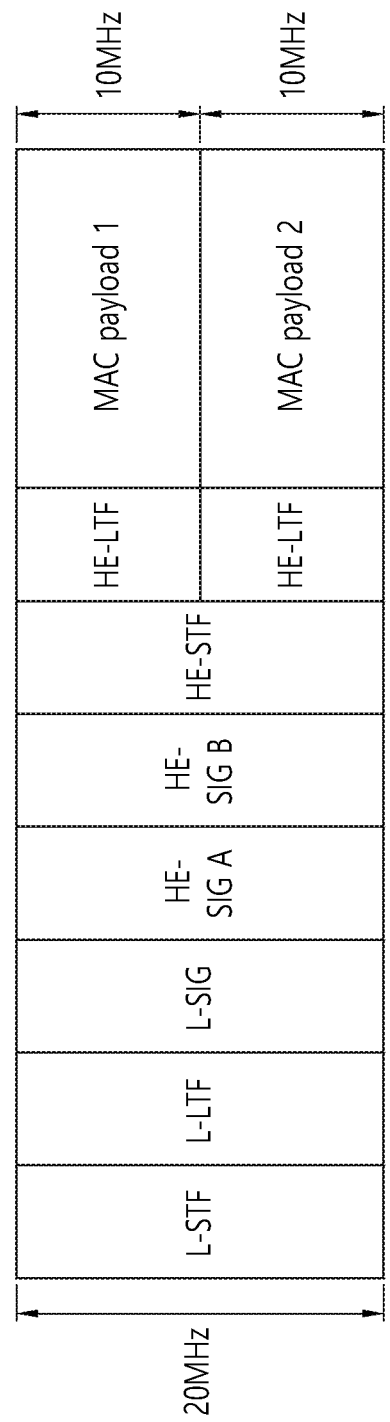
FIG. 17 is a diagram illustrating one example of a format of a probe response frame according to one aspect of the present invention.

FIG. 17 illustrates one example of a format of a probe response frame.

The probe response frame may include a temporary identifier field and/or a temporary flag field.

Temporary identifier information includes information on a temporary identifier temporarily allocated to each STA to which the AP transmits the probe request frame. The temporary identifier may include a temporary (association ID) AID. The temporary AID may be an AID which is previously reserved or not used among allocable AIDs. The information on the temporary ID may be transmitted while being loaded on the ACK for the probe request frame.

The temporary flag field announces to each UE whether the allocated identifier is the temporary identifier. The temporary flag field ID may be situationally transmitted while being loaded on the ACK for the probe request frame.

The L-STF, L-LTF, and L-SIG are the same as the components of the PPDU format. Therefore, since both the HE STA and the legacy STA may perform decoding, the transmission opportunity (TXOP) of the probe request frame may be protected.

The HE-SIG A and the HE-SIG B may follow the configuration of the HE-PPDU. The May payload includes information on the probe response frame.

The probe response frame may be transmitted to a plurality of STAs by the MU-OFDMA scheme and transmitted through a plurality of sub channels. Herein, it is illustrated that probe responses to STA1 and STA2 are transmitted to 2 10 MHz subchannels divided from the total bandwidth 20 MHz.

According to another aspect of the present invention, the trigger frame for the association request frame may be immediately transmitted to the UE instead of the probe response frame. A subsequent detailed operation is described below.

When the STA clearly expresses the association intent through the probe request frame, information on the existing probe response frame need not be transmitted to the UE again, and as a result, transmission of the probe response frame may be omitted.

Figure 18:
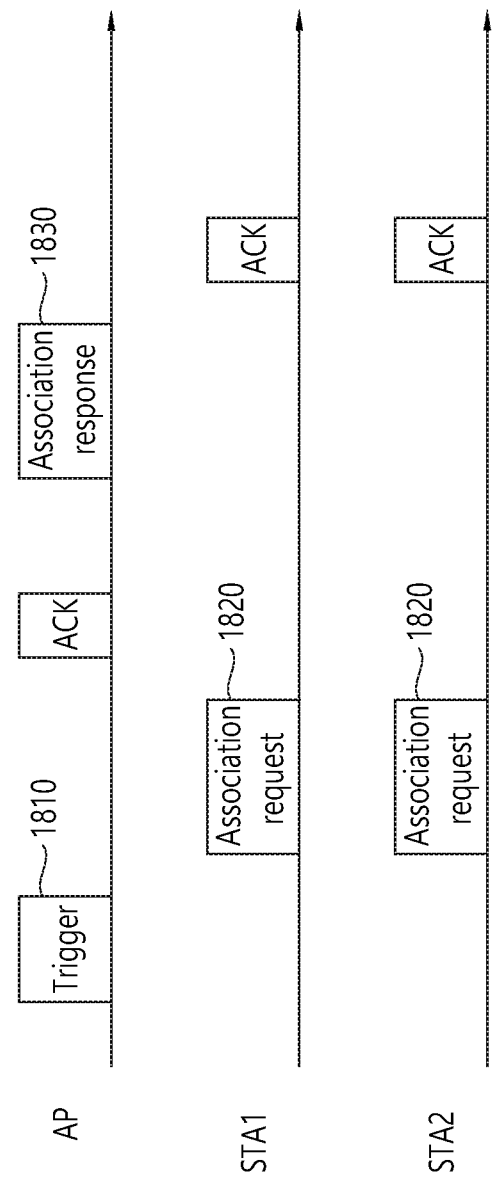
FIG. 18 is a diagram illustrating one example of an association establishment process according to another aspect of the present invention.

FIG. 18 is a diagram illustrating one example of an association establishment process according to one aspect of the present invention.

The AP allocates the temporary AID to the STA that wants the association through the active scanning. The AP may allocate resource information by using the temporary AID and transit a trigger frame 1810 including the allocated resource information to the STA. For example, the trigger frame 1810 may include information regarding subchannel 1 for STA1 and subchannel 2 for STA2.

Each STA that receives the trigger frame transmits an association request frame 1820 to the AP with each allocated resource by using the MU-OFDMA technique. STA1 transmits the association request frame to the AP through subchannel 1 and transmits the association request frame to the AP through subchannel 2.

Thereafter, the AP transmits an association response frame 1830 to UEs to announce an association result to the STA.

When the STA already knows network information through the passive scanning, the temporary AID need not be allocated through the active scanning. The STA may transmit the association request frame to the AP by the SU-OFDMA scheme.

The trigger frame 1810 for the association process may include resource allocation information and/or frame type information. The resource allocation information represents the resource (e.g., the subchannel and the bandwidth) allocated to the STA corresponding to each temporary AID for the MU-OFDMA. The frame type information is information for distinguishing whether the transmitted trigger frame is a trigger frame transmitted to an unspecific UE, a trigger frame for an association request, or a trigger frame for the UL MU-MIMO or UL MU-OFDMA for the active scanning.

Figure 19:
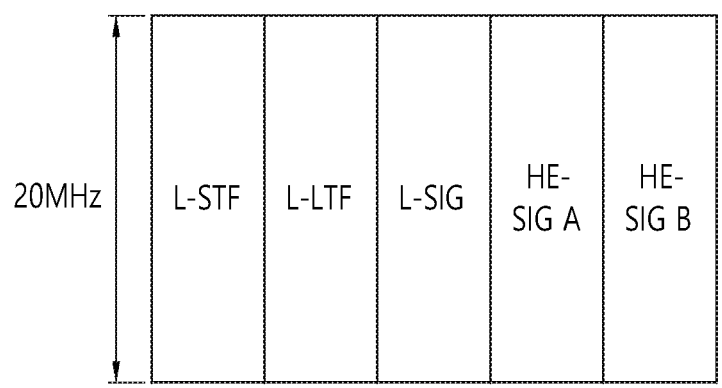
FIG. 19 is a diagram illustrating one example of a format of a trigger frame for an association process.

FIG. 19 illustrates one example of a format of a trigger frame for an association process.

The L-STF, L-LTF, and L-SIG are the same as the components of the PPDU format. The HE-SIG B may include the information of the trigger frame.

Figure 20:
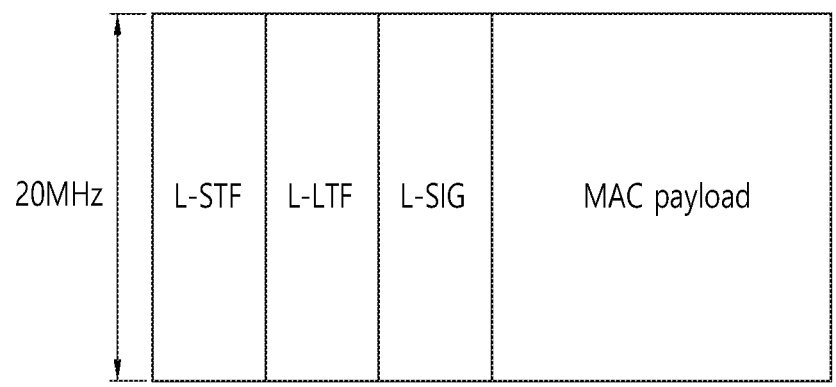
FIG. 20 is a diagram illustrating another example of the format of the trigger frame for the association process.

FIG. 20 is a diagram illustrating another example of the format of the trigger frame for the association process. FIG. 20 illustrates that the trigger frame is generated based on the legacy PPDU format of FIG. 3. The trigger frame is transmitted as the MAC frame. The MAC payload may include the information of the trigger frame.

Figure 21:
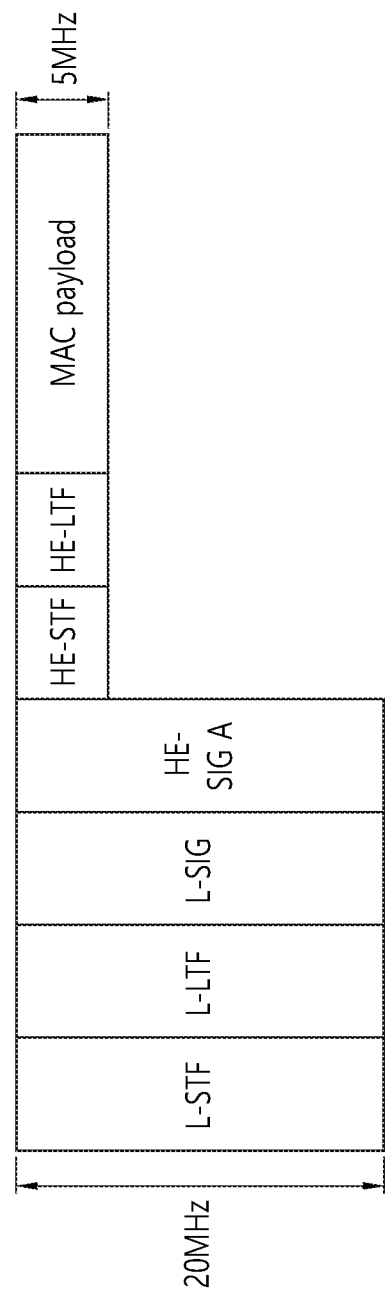
FIG. 21 is a diagram illustrating one example of a format of an association request frame.

FIG. 21 is a diagram illustrating one example of a format of an association request frame.

The L-STF, L-LTF, and L-SIG are the same as the components of the PPDU format. The May payload includes information on the association request frame.

The association request frame may be transmitted to the AP by the MU-OFDMA scheme. The L-STF/L-LTF/L-SIG/HE-SIG A may be transmitted in the 20 MHz bandwidth and the HE-STF, HE-LTF, and MAC payload may be transmitted in the smaller bandwidth (e.g., 5 MHz bandwidth).

Figure 22:
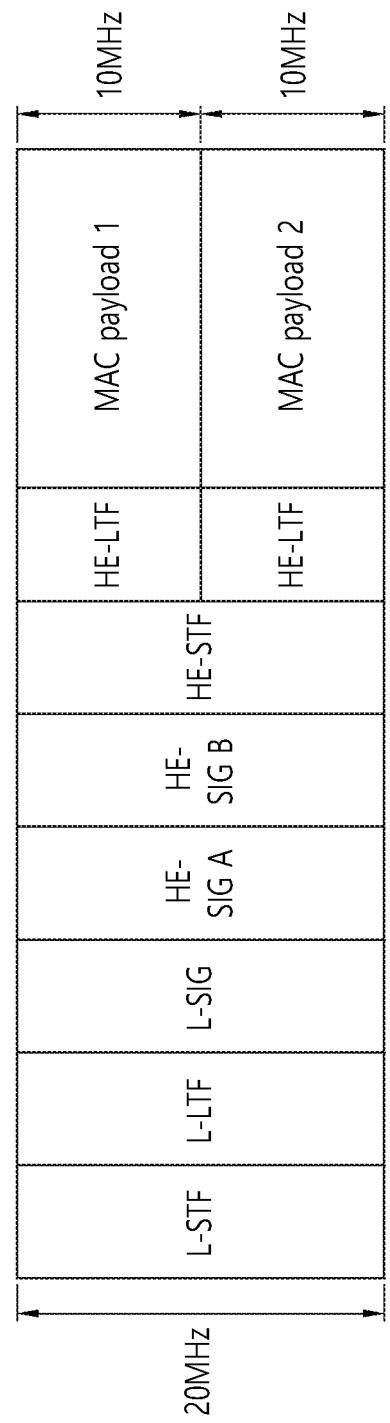
FIG. 22 is a diagram illustrating one example of a format of an association response frame.

FIG. 22 is a diagram illustrating one example of a format of an association response frame.

The L-STF, L-LTF, and L-SIG are the same as the components of the PPDU format. HE-SIG A and HE-SIG B may follow the configuration of the HE-PPDU. The May payload includes information on the association response frame.

The association response frame may be transmitted to the plurality of STAs by the MU-OFDMA scheme and transmitted through a plurality of subchannels. Herein, it is illustrated that association responses to STA1 and STA2 are transmitted to 2 10 MHz subchannels divided from the total bandwidth 20 MHz.

Figure 23:
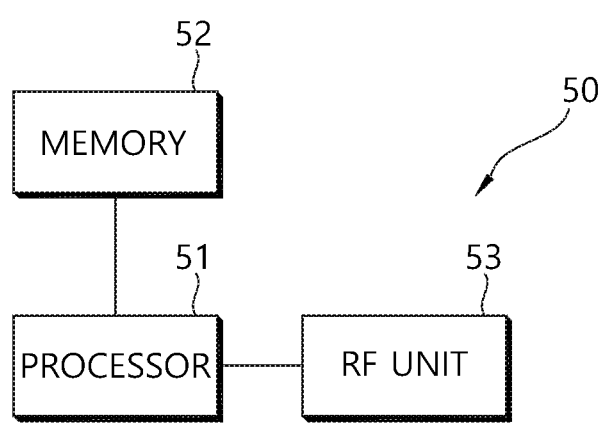
FIG. 23 is a block diagram illustrating a wireless apparatus in which an embodiment of the present invention is implemented.

FIG. 23 is a block diagram illustrating a wireless apparatus in which an embodiment of the present invention is implemented.

The wireless apparatus 50 includes a processor 51, a memory 52, and a radio frequency (RF) unit 53. The wireless apparatus may be an AP or a non-AP STA in the aforementioned embodiment. The RF unit 53 is connected with the processor 51 to transmit and/or receive a radio signal. The processor 51 implements a function, a process, and/or a method which are proposed. In the aforementioned embodiment, an operation of the AP or the non-AP STA may be implemented by the processor 51. The memory 52 is connected with the processor 51 to store an instruction to implement an operation of the processor 51.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned embodiment, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing active scanning in a wireless communication system by a station (STA) that includes a memory, processor, transceiver and antenna, the method comprising:

receiving, from an access point (AP) by a station (STA), a triggerframe via a wireless channel including a plurality of subchannels based on orthogonal frequency division multiple access (OFDMA), wherein the trigger frame is followed by the transmission of a plurality of probe request frames from a plurality of STAs, and wherein the trigger frame includes:

first including information on a probing duration which allows transmission of a allowed for the plurality of probe request frames, second information for identifying the plurality of STAs that are permitted to transmit the plurality of probe request frames in the probing duration, and third information on the plurality of subchannels allocated for each of the plurality of STAs; and transmitting a probe request frame to the AP in response to the trigger frame, wherein the probe request frame is transmitted via a subchannel allocated for the STA among the plurality of subchannels.

2. The method of claim 1, wherein a bandwidth of the subchannel is smaller than a bandwidth of the wireless channel.

3. The method of claim 1, wherein the trigger frame further includes information on a trigger period in which the trigger frame is transmitted.

4. The method of claim 1, wherein the trigger frame further includes frame type information representing that the trigger frame is used for the active scanning.

5. The method of claim 1, further comprising:
receiving, by the STA, a probe response frame from the AP as a response to the probe request frame.

6. The method of claim 5, wherein the probe response frame includes information on a temporary identifier allocated to the STA.

7. The method of claim 1, wherein the probe request frame is transmitted after a specific interval after the trigger frame is received.

8. A wireless apparatus in a wireless communication system, comprising:
a radio frequency (RF) unit including a transceiver transmitting and receiving a radio signal; and
a processor connected to the RF unit,
wherein the processor is configured to:
receive from an access point (AP) a trigger frame via a wireless channel including a plurality of subchannels based on orthogonal frequency division multiple access (OFDMA),
wherein the trigger frame simultaneously solicits a plurality of probe request frames from a plurality of stations (STAs), and
wherein the trigger frame includes:
first information on a probing duration allowed for the plurality of probe request frames
second information for identifying the plurality of STAs that are permitted to transmit the plurality of probe request frames in the probing duration, and
third information on the plurality of subchannels allocated for each of the plurality of STAs, and
transmit a probe request frame to the AP in response to the trigger frame,
wherein the probe request frame is transmitted via a subchannel allocated for the STA among the plurality of subchannels.

\* \* \* \* \*